United States Patent [19]

Sakakibara

[11] 4,339,076

[45] Jul. 13, 1982

[54] CONTROL SYSTEM FOR AUTOMOBILE AIR CONDITIONERS

[75] Inventor: Naoji Sakakibara, Chiryu, Japan

[73] Assignee: Aisin Seiki Kabushiki Kaisha, Kariya, Japan

[21] Appl. No.: 129,477

[22] Filed: Mar. 11, 1980

[30] Foreign Application Priority Data

Mar. 16, 1979 [JP] Japan .................................. 54-31374

[51] Int. Cl.³ .................. G05D 23/00; B60H 3/00
[52] U.S. Cl. ...................................... 236/84; 91/361; 165/43
[58] Field of Search ............... 165/23, 43; 236/84; 91/361

[56] References Cited

U.S. PATENT DOCUMENTS

3,315,730  4/1967  Weaver et al. ..................... 165/23
3,477,346 11/1969  Slavin et al. .......................... 91/361

Primary Examiner—William E. Wayner
Attorney, Agent, or Firm—Oblon, Fisher, Spivak, McClelland & Maier

[57] ABSTRACT

A control system for an automobile air conditioner including an air blend door for adjusting the output of the air conditioner, a vacuum actuator including a hermetic chamber and a control member, the control member being connected to control the air blend door proportionally to the pressure within the chamber, a vacuum modulator including a first valve for exhausting air from the chamber to a vacuum reservoir, a second valve for emitting air from atmosphere to the chamber and a restriction member arranged at the entrance side of the chamber, a control circuit for providing a first electrical driving signal for operating the first valve so as to open and a second electrical driving signal for operating the second valve so as to open proportionally to the difference between a selected temperature within the automobile and the actual temperature within the automobile, an integrating circuit for providing integrated outputs of the first electrical driving signal and the second electrical driving signal with a time constant determining the volume of the chamber and the diameter of the restriction and a feedback loop for applying the integrated outputs to the input of the control circuit.

4 Claims, 3 Drawing Figures

CONTROL SYSTEM FOR AUTOMOBILE AIR CONDITIONERS

BACKGROUND OF THE INVENTION

1. Field of the Invention

The present invention relates to control system for automobile air conditioners and, more particularly, to an improvement in a position feedback loop for an actuator to maintain constant a selected temperature within the car.

2. Description of Prior Art

The conventional position feedback circuit is disclosed, for example, in U.S. Pat. No. 3,315,730 granted on Apr. 25, 1967 to Weaver et al.

Such a conventional position feedback loop includes a potentiometer, the arm of which is mechanically linked to a control arm of an actuator to provide a voltage linearly proportional to the control arm position.

Using a potentiometer results not only in higher cost but also in defectively increasing the mechanical load to the actuator.

SUMMARY OF THE INVENTION

One of the objects of the present invention is to provide a position feedback loop for an actuator in a control system for automobile air conditioners which serves to overcome the disadvantages in conventional position feedback circuits.

Another object of the present invention is to provide an improved position feedback loop for an actuator which is low in cost and simple in construction.

According to the invention, the position feedback loop includes means for integrating electrical driving signals to an actuator with a capacitor and a resistance having a time constant substantially equal to a time constant determined by the volume of the chamber of the actuator leading control pressure and a restriction arranged at an entrance side of the chamber.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several view, and wherein.

DETAILED DESCRIPTION OF THE PREFERRED EMBODIMENTS

Figure 1:
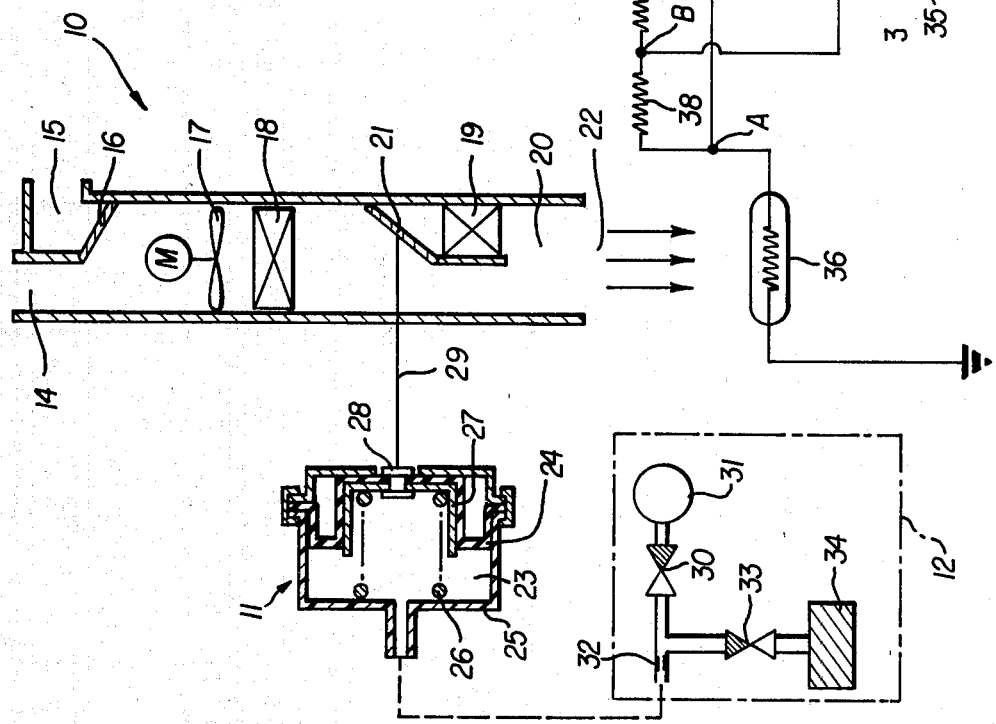
FIG. 1 is a functional diagram of a control system for automobile air conditioners using a position feedback loop for an actuator to maintain constant a selected in-car temperature according to the invention.

The control system of the present invention for an automobile air conditioner includes an air conditioning apparatus 10, a vacuum actuator 11 for controlling the temperature within a car, a vacuum modulator 12 for controlling power to the actuator 11 and a control circuit 13 including a position feedback loop for controlling the vacuum modulator 12. The air conditioning apparatus 10 includes a first entry or opening 14 for introducing atmospheric air, a second entry or opening 15 for introducing inside air, a manually operated switch door 16 for closing of either entry 14 or entry 15, a blower 17 for controlling the quantity of air mass flow, an air conditioner evaporator 18 for cooling the temperature of the introduced air, a heater 19 for warming the cooled air, a chamber 20 for mixing the remaining cooled air with warmed air passed through the heater 19, an air blend door 21 for controlling the proportions of warm and cold air to provide a comfortable temperature in the chamber 20 and a duct 22 for communicating air from chamber 20 into the passenger compartment.

The actuator 11 includes an expansible chamber 23 formed with a flexible rubber diaphragm 24 sealed to a hermetic shell 25 enclosing a force spring 26 and a cup-shaped rigid piece 27, a rivet 28 and a control arm 29. The cup-shaped rigid piece 27 is fastened to the diaphragm 24 to reinforce it and cause it to retain its shape as vacuum is drawn into the chamber 23. One end of control arm 29 is fastened to the diaphragm 24 and the cup-shaped piece 27 by the rivet 28. The other end of control arm 28 is pivoted at the door 21.

A reduction of pressure below atmospheric within the chamber 23 of actuator 11 collapses the chamber 23 to a point where the compressive force of spring 26 balances the force due to the pressure difference across diaphragm 24. When the pressure within the chamber 23 of actuator 11 is at atmospheric pressure the spring 26 is extended fully as shown in FIG. 1 and the control arm 29 is in one extreme position. This position may be that demanding maximum cooling, depending upon the manner in which the control arm 29 is linked to control the variable of the air conditioning apparatus 10.

When the pressure within the chamber 23 of actuator 11 has been reduced to the minimum obtainable with a vacuum reservoir 31, the spring 26 is compressed to the fullest possible extent and control arm 29 will be in its other extreme position. This position may be that demanding maximum heating.

The vacuum modulator 12 includes a first solenoid valve 30 for allowing communication from the chamber 23 to the vacuum reservoir 31 through a restriction 32 when the valve 30 is energized so that the valve 30 opens and a second solenoid valve 33 for allowing communication from the chamber 23 to atmospheric air through the restriction 32 and an air filter 34 when the valve 33 is energized so that the valve 33 opens. The control circuit 13 of the invention including the position feedback loop is thus completed.

Figure 2:
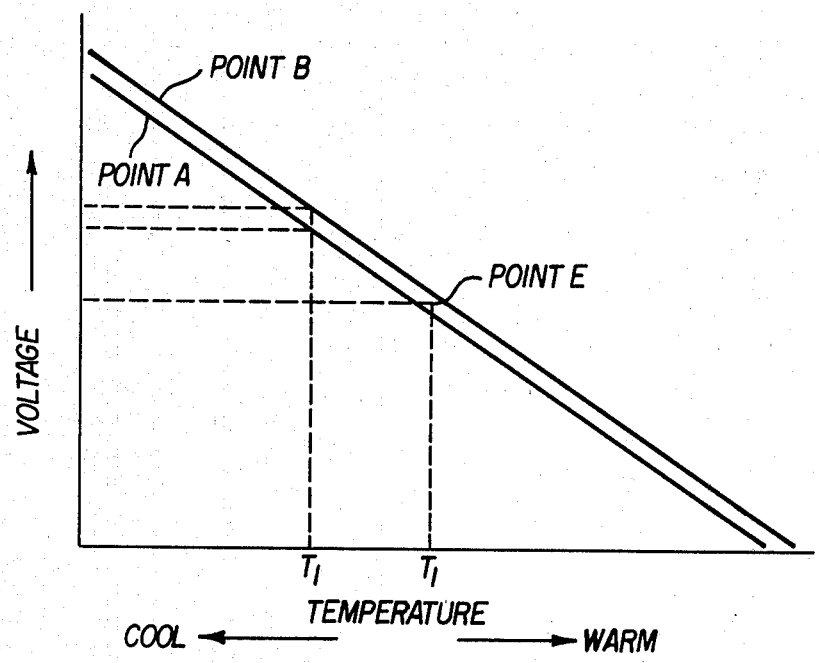
FIG. 2 is a graph showing the characteristics of the in-car temperature and a selected in-car temperature of the invention.

The signal representing the selected temperature within the car is generated in a voltage divider which includes an adjustable rheostat 35, calibrated in terms of the desired temperature within the car, connected in parrallel with a component including a thermistor 36 exposed to the temperature of the passenger compartment, a resistor 37 and a resistor 38. The thermistor 36 responds to temperature variations by changing resistance. If the temperature within the car should now decrease, the resistance of thermistor 36 would increase. The thermistor 36 is connected in series with the resistor 38 which is connected in series with the resistor 37. The resistance of resistor 38 is relatively small so that the voltage at a point A of the high side of thermistor 36 is somewhat lower as shown in FIG. 2 than the voltage at a point B connecting the resistor 37 and the resistor 38.

The blind area of temperature control is produced with the voltage at point A and the voltage at point B. The voltage at point A and the voltage at point B are generated as the signal representing the actual temperature within the car. The voltage representing the selected temperature within the car is generated at a point C of the output of rheostat 35. The point D connecting a field effect transistor 39 and a resistor 40 generates the impedance-converted voltage of the gate voltage of field effect transistor 39. The voltage adding the voltage of point C and the voltage of point D through a resistor 41 and a resistor 42, respectively, is applied to a point E connecting an inversion input of comparator 43 and a non-inversion input of comparator 43. The voltage at point A is applied to a non-inversion input of comparator 43. The voltage at point B is applied to an inversion input of comparator 44.

The comparator 43 generates a first electrical driving signal as high voltage to energize a winding 30a of first solenoid valve 30 when the voltage at point A is higher than the voltage at point E. The first solenoid valve 30 is operated to open by the first driving signal. The first driving signal is integrated through diode 47 in an integrating circuit including the resistor 45 and capacitor 46, so that the capacitor 46 is charged to high voltage corresponding with the first driving signal being a time constant decided by the capacity of capacitor 46 and the resistance of resistor 45 which is selected to be equal to the time constant corresponding to the ventilation resistance of the volume of chamber 23 of actuator and the diameter of restriction 32. The voltage at point F on the high side of capacitor 46 is transferred to the point D through field effect transistor 39. The comparator 44 generates a second electrical driving signal as high voltage to energize a winding 33a of second solenoid valve 33 when the voltage at point E is higher than the voltage at point B.

The second solenoid valve 33 is operated to open in response to the second driving signal. The inversion output of inverter 48 is changed to low voltage when generating the second driving signal so that the voltage at point F is discharged through a diode 49 and the inverter 48 with a time constant decided by the capacity of capacitor 46 and the resistance of resistor 45 which is selected to be equal to the time constant corresponding to the ventilation resistance of the volume of chamber 23 of actuator and the diameter of restriction 32. Such a time constant is disclosed in standard control teats such as "Control And Dynamic Systems", by Takahashi, Rabins and Auslander, 1970 by Addison-Wesley Publishing Co., as at pages 37 and 211 while the pneumatic analog of such a value is discussed at pages 162–174. The voltage at point F is applied to the point E as the feedback voltage corresponding to the position of control arm 29 in actuator 11 through field effect transistor 39 and resistor 42 provided that actuator 11 operates in its intended manner, that is, by either fully opening or closing air blend door 21. Reference numeral 50 denotes a battery.

In operation, the actual temperature $T_1$ within the car is lower than selected temperature $T_0$ within the car and the voltages at point A and point B are higher than the voltage at point E so that the first driving signal is generated. This will cause the first solenoid valve 30 to open, thereby increasing the negative pressure within the chamber 23 of the actuator 11 and causing movement of the control arm 29 in a proper leftward direction to adjust the air blend door 21. Therefore, the cooled air from the air conditioner evaporator 18 to the chamber 20 is heated and the voltage at point E adding the voltage at point F integrated to the first driving signal approaches being equal to the voltage at point A. When the voltage at point E reaches the voltage at point A, the first driving signal will disappear and the first solenoid valve 30 will return to a closed position. The pressure within the chamber 23 of the actuator 11 is stabilized at a new value. No further control arm movement is necessary, at least until an altered temperature within the car results in a new temperature and no further demands for vacuum power are made.

The response of actuator 11 is much more rapid to a change in applied vacuum than is the temperature of the air to a change of heat produced by the air conditioning apparatus 10. Consequently, the closed position feedback loop of the control system of the invention causes the air conditioning system to adjust the temperature within the car automatically with an advance compensation in the control position to thereby produce less fluxuation in the temperature within the car as it approaches being equal to the selected temperature within the car. If the adjusted actual temperature within the car is changed to be higher than the selected in car temperature, the voltage at point B is changed to be lower than the voltage at point E so that the second driving signal is generated. This will cause the second solenoid valve 33 to open, thereby decreasing the negative pressure within the chamber 12 of actuator 11 and causing movement of the control arm 29 in a proper rightward direction to adjust the air blend door 21 with the voltage at point E decreasing correspondingly to the amount of the discharged voltage at point F by integrating the second driving signal approaching being equal to the voltage at point B. When the voltage at point E reaches the voltage at point B, the second driving signal will disappear and the second solenoid valve 33 will return to a closed position. The closed position feedback loop of the control system of the present invention causes the air conditioning system to adjust the temperature within the car automatically to the selected temperature within the car with advance compensation in the control arm position to thereby produce less fluxuation in the temperature within the car similarly to the above-noted case.

Figure 3:
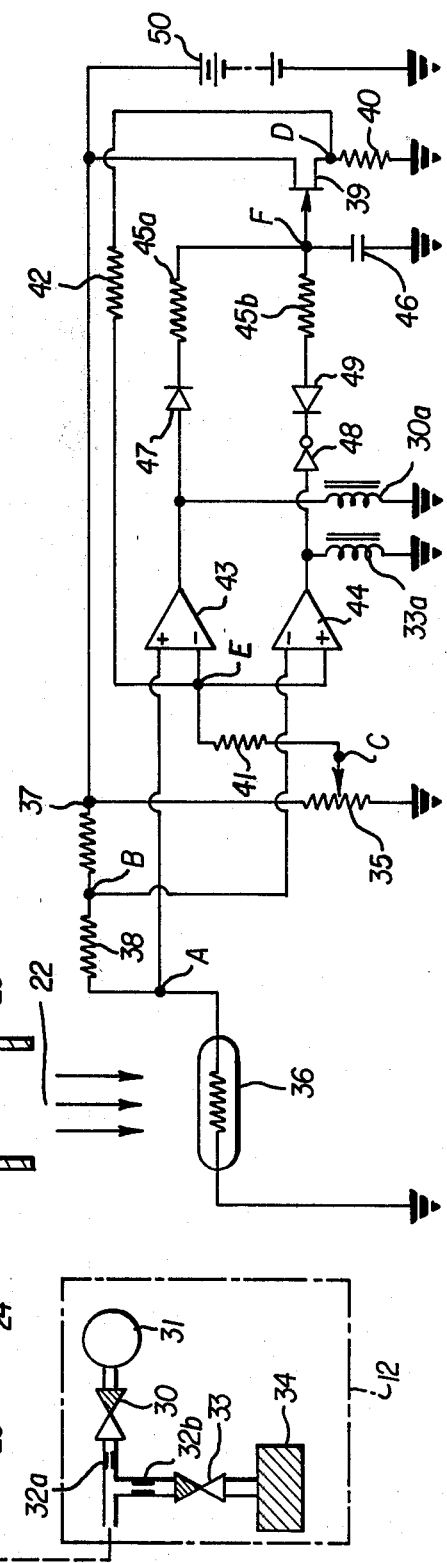
FIG. 3 is a view similar to FIG. 1 illustrating a modified embodiment of the present invention.

According to a modified embodiment of the present invention as shown in FIG. 3, the above-noted restriction of vacuum modulator 12 is respectively arranged at the output end of first solenoid valve 30 and the output end of second solenoid valve 33 as a first restriction 32a and a second restriction 32b. The integrating circuit of position feedback loop includes the aforementioned capacitor 46, a charging resistor 45a and a discharging resistor 45b instead of above-noted resistor 45. The time constant determined by the capacity of capacitor 46 and the resistance of resistor 45a is selected to be equal to a time constant decided by the volume of chamber 23 of actuator 11 and the diameter of first restriction 32a, and the time constant determined by the capacity of capacitor 46 and the resistance of resistor 45b is selected to be equal to the time constant decided by the volume of chamber 23 of actuator 11 and the diameter of second restriction 32b. The comparator 43 generates a first electrical driving signal as high voltage to energize the winding 30a of first solenoid valve 30 when the voltage at point A is higher than the voltage at point E. The first solenoid valve 30 is operated to open by the first driving signal. The first driving signal is integrated through diode 47 in the integrated circuit including the charging resistor 45a and capacitor 46, so that the capacitor 46 is charged to high a voltage corresponding with first driving signal being a time constant decided by the capacity of capacitor 46 and the resistance of charging resistor 45a is selected to be equal to time constant corresponding to the ventilation resistance of the volume of chamber 23 of actuator 11 and the diameter of first restriction 32a. The voltage at point F on the high side of capacitor 46 is transferred to the point D through field effect transistor 39. The comparator 44 generates the second electrical driving signal as high voltage to energize a winding 33a of second solenoid valve 33 when the voltage at point E is higher than the voltage at point B. The second solenoid valve 33 is operated to open in response to the second driving signal. The inversion output of inverter 48 is changed to low voltage when generating the second driving signal so that the voltage at point F is discharged through a diode 49 and the inverter 48 with the time constant decided by the capacity of capacitor 46 and the resistance of discharging resistor 45b is selected to be equal to the time constant corresponding to the ventilation resistance of the volume chamber 23 of actuator 11 and the diameter of second restriction 32b. The voltage at point F is applied to the point E as the feedback voltage corresponding to the position of control arm 29 in actuator 11 through field effect transistor 39 and resistor 42.

Obviously, many modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A control system for an automobile air conditioner comprising:

an air blend door for adjusting the output of the air conditioner;

a vacuum actuator including a hermetic chamber and a control member, said control member being connected to control said air blend door proportionally to the pressure within said chamber;

a vacuum modulator including a first valve for exhausting air from said chamber to a vacuum reservoir;

a second valve for admitting air from atmosphere to said chamber and a restriction member arranged at the entrance side of said chamber;

a control circuit for providing a first electrical driving signal for operating said first valve so as to open said first valve and a second electrical driving signal for operating said second valve so as to open said second valve proportionally to the difference between a selected temperature within said automobile and an actual temperature within said automobile;

an integrating circuit for providing integrated outputs of said first electrical driving signal and said second electrical driving signal with a time constant determining the volume of said chamber and the diameter of said restriction wherein said first electrical driving signal and said second electrical driving signal are integrated by a time constant corresponding to ventilation resistances of the volumes of said chamber and said restriction member; and a feedback loop for applying said integrated outputs to the input of said control circuit.

2. A control system as claimed in claim 1 wherein said integrating circuit comprises a capacitor and a resistor.

3. A control system as claimed in claim 1 wherein said integrating circuit comprises a capacitor, a charging resistor and a discharging resistor.

4. A control system as claimed in claims 1, 2 and 3 wherein said control circuit includes a thermistor responding to temperature variations by changing resistance.

* * * * *